United States Patent [19]

O'Farrell et al.

[11] Patent Number: 5,624,176
[45] Date of Patent: Apr. 29, 1997

[54] ILLUMINATED POWER TILT EXTERIOR MIRROR FOR VEHICLE

[75] Inventors: Desmond J. O'Farrell; Roger L. Veldman, both of Holland, Mich.

[73] Assignee: Donnelly Corporation, Holland, Mich.

[21] Appl. No.: 547,953

[22] Filed: Oct. 25, 1995

[51] Int. Cl.⁶ .................................................. B60Q 1/22
[52] U.S. Cl. ................. 362/83.1; 362/143; 362/276; 362/802; 340/456; 340/463; 359/843; 359/844
[58] Field of Search ............................ 340/435, 436, 340/456, 461, 463, 525, 555, 556, 958; 359/843, 844, 602, 604; 362/83.1, 276, 802, 140–144

[56] References Cited

U.S. PATENT DOCUMENTS

| | | | |
|---|---|---|---|
| 4,855,878 | 8/1989 | Vu et al. | 362/802 |
| 4,890,907 | 1/1990 | Vu et al. | 362/83.1 |
| 4,936,671 | 6/1990 | Kaspar | 359/877 |
| 5,151,824 | 9/1992 | O'Farrell | 359/604 |
| 5,193,029 | 3/1993 | Schofield et al. | 359/604 |
| 5,371,659 | 12/1994 | Pastrick et al. | 362/83.1 |
| 5,497,305 | 3/1996 | Pastrick et al. | 362/83.1 |
| 5,497,306 | 3/1996 | Pastrick | 362/83.1 |

*Primary Examiner*—Alan Cariaso
*Attorney, Agent, or Firm*—Van Dyke, Gardner, Linn & Burkhart, LLP

[57] ABSTRACT

A mirror system for a vehicle includes at least one exterior mirror having a reflective element, a housing for the reflective element, a positioning device for selectively positioning the reflective element, and a light for emitting light generally downwardly from the mirror housing on an area adjacent the side of the vehicle. A control is responsive to the vehicle reverse gear selector being in reverse gear for causing the positioning device to position the reflective element to a downwardly tilted position, wherein the driver can view an area adjacent a side of the vehicle. The control actuates the light when the reflective element is in the downwardly tilted position in order to illuminate objects in that area. In a preferred embodiment, the control actuates the light through a lockout circuit which normally allows the light to be activated only when the vehicle is not operating. The control includes an override for the lockout circuit which allows the light to be activated even when the vehicle is operating when, and only when, reverse gear is selected.

30 Claims, 5 Drawing Sheets

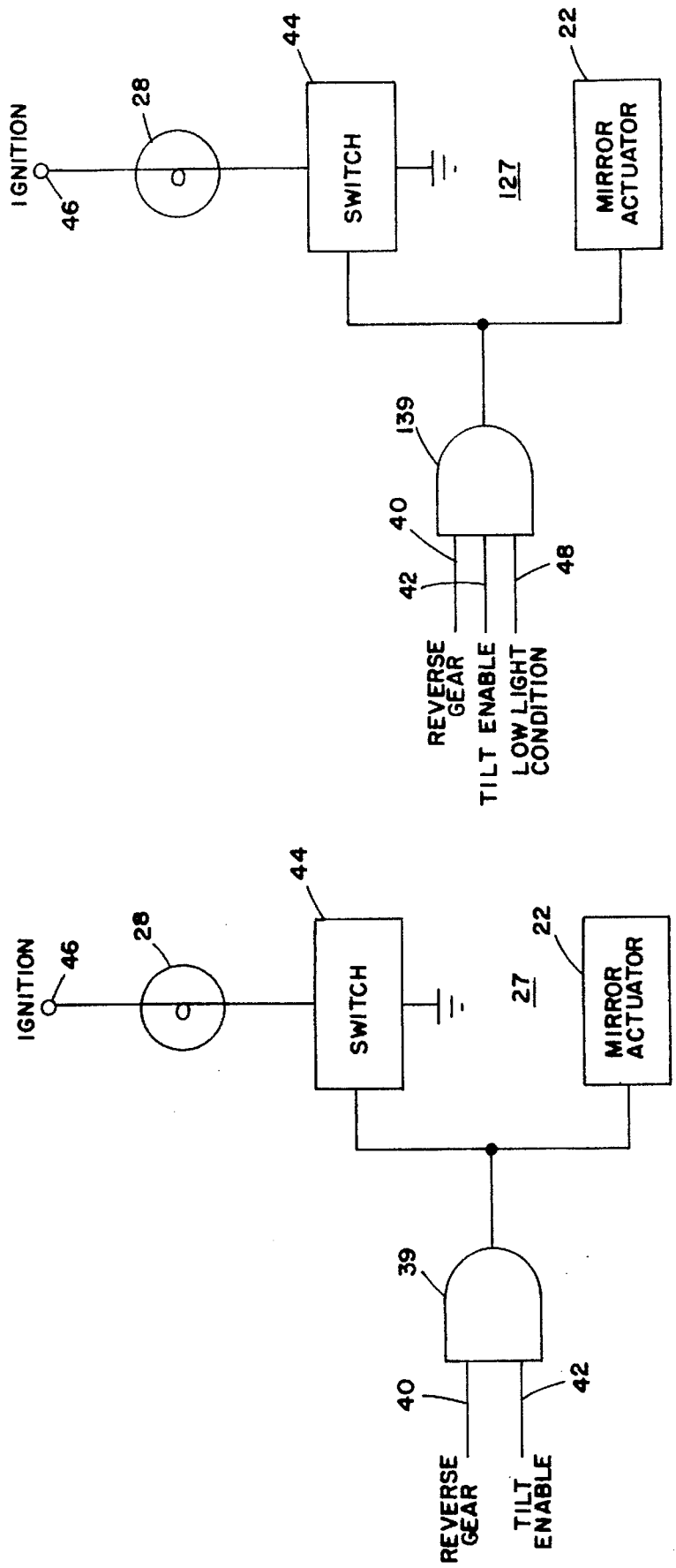

ILLUMINATED POWER TILT EXTERIOR MIRROR FOR VEHICLE

BACKGROUND OF THE INVENTION

This invention relates generally to vehicle rearview mirror systems and, more particularly, to exterior mirror systems that are adapted to provide rearward vision during parking maneuvers.

Conventional exterior mirrors of a vehicle are not of much assistance to the driver when reversing the vehicle into tight spaces. The reason is that the exterior mirrors are typically adjusted in order to provide vision directly rearwardly of the vehicle. During parking maneuvers, including rearwardly maneuvering of the vehicle into a parking space, it would be desirable to be able to observe, through the rearview mirrors, impediments to the side of the vehicle including adjacent vehicles, elevated curbs, posts, and the like.

One solution to providing vision to the side of a vehicle during reversing maneuvers is the power tilt mirror. A power tilt mirror responds to the vehicle being placed in a reverse gear mode by rotating the exterior mirror, or mirrors, about a horizontal axis to a downwardly tilted orientation. This allows the driver to observe areas to the side of the vehicle rather than areas principally to the rear of the vehicle. The tilting of the mirror may be accomplished by a separate tilt mechanism provided specifically for the power tilt function or may be provided by programming the memory function of a conventional remote positioning device to respond to the vehicle being placed in reverse gear by going in the downward tilt memory position. A power tilt exterior mirror is disclosed in U.S. Pat. No. 4,936,671 issued to Kaspar for an OUTSIDE REAR-VIEW MIRROR FOR A MOTOR VEHICLE HAVING A REVERSE GEAR.

The difficulty with such power tilt mirror is that the driver is unable to observe objects at the side of the vehicle at night. The reason is that the side of the vehicle is not illuminated at night when the vehicle is being operated. Although vehicles are equipped with backing lights which illuminate the rear of the vehicle during backing maneuvers, such lights do not adequately illuminate objects at the side of the vehicle. Therefore, the power tilt mirror has not achieved its intended object of providing visual assistance to the driver of a vehicle who is rearwardly maneuvering a vehicle, at night, into a parking space.

SUMMARY OF THE INVENTION

The present invention overcomes the drawbacks of the prior art by providing illumination to assist the use of a power tilt mirror at night. This is accomplished according to an aspect of the invention in a mirror system for a vehicle having an exterior mirror assembly, including a reflective element, a housing for the reflective element, and a positioning device for selectively positioning the reflective element at least about a horizontal axis. A control is provided that is responsive to the vehicle reverse gear selector being placed in a reverse gear mode for causing the positioning device to position the reflective element about the horizontal axis to a downwardly tilted position. In this position, the driver can view an area adjacent a side of the vehicle. A light is provided for emitting light generally downwardly from the mirror housing on an area adjacent that side of the vehicle that is generally viewable in the reflective element when in its downwardly tilted position. The control actuates the light when the reflective element is in the downwardly tilted position in order to illuminate objects in that area.

In a preferred form, the control is further responsive to either a headlamp control circuit or a twilight sentinel circuit in order to actuate the light only during low lighting conditions.

According to another aspect of the invention, a mirror system for a vehicle further includes a user operable lamp selector such as a keyless entry device and/or an interior lamp control circuit of the type which illuminates the vehicle interior when a door is opened, or the like. The control receives a first input that is responsive to the operating condition of the vehicle, a second input that is responsive to the vehicle reverse gear selector, and a third input that is responsive to the user operable lamp selector. The control includes a first output for selectively actuating the light and a second output for selectively causing the positioning device to position the reflective element to a downwardly tilted position. The control causes the positioning device to position the reflective element to a downwardly tilted position in response to a reverse gear selector being in a reverse mode. The control includes a lockout circuit and is capable of actuating the light when the lamp selector is operated by the user, provided that the vehicle is in a non-operating condition. The control further includes a lockout circuit override means which overrides the lockout circuit when the reverse gear selector is in a reverse mode so that the light can be actuated when the vehicle is in an operating condition.

The present invention provides illumination at the side of a vehicle in order to illuminate objects, such as parked vehicles, curbs, posts and the like, in an area intended to be observed by the driver through exterior mirrors when in a power tilt mode. This allows the power tilt feature to achieve its optimum performance because it is useful during not only daylight conditions but also at night and during other low lighting level conditions. The present invention also allows the side of the vehicle to be illuminated with a light that can be activated even when the vehicle is operating if, and only if, the reverse gear is selected.

These and other objects, advantages, and features of this invention will become apparent upon review of the following specification in conjunction with the drawings.

BRIEF DESCRIPTION OF THE DRAWINGS

FIG. 5 is a block diagram of an electronic control circuit according to an embodiment of the invention;

FIG. 6 is a block diagram of an electronic control circuit according to a first alternative embodiment of the invention.

DESCRIPTION OF THE PREFERRED EMBODIMENT

Figure 1:
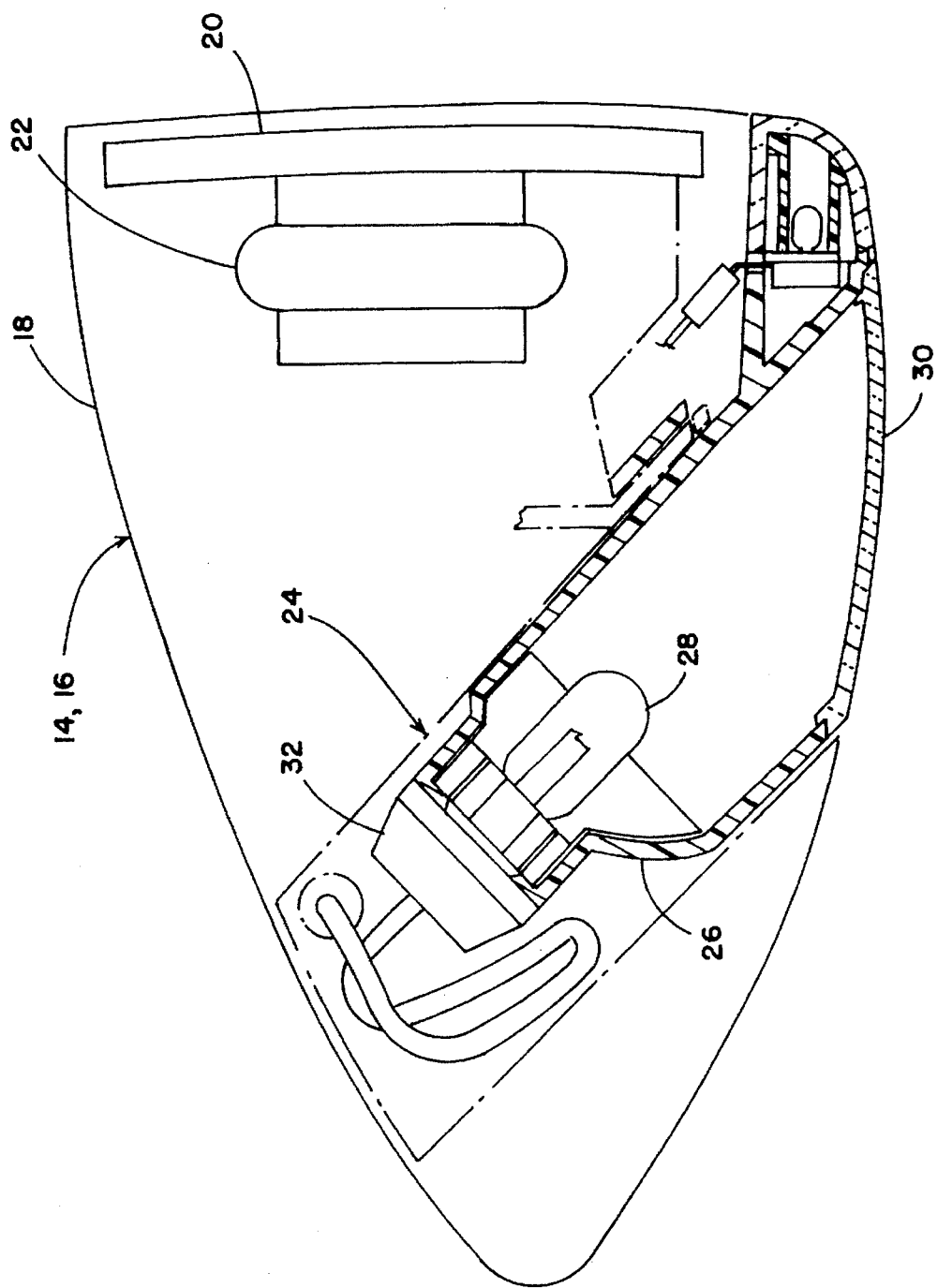
FIG. 1 is a sectional side view of an exterior mirror assembly according to the invention.

Referring now specifically to the drawings and the illustrative embodiments depicted therein, a mirror system 10 for a vehicle 12 includes a first exterior mirror assembly 14 on the driver's side of the vehicle and a second exterior mirror 16 on the passenger side of the vehicle. Each mirror assembly 14, 16 includes a housing 18 mounted to a side of the vehicle (FIGS. 1–4), a reflective element 20 positioned within housing 18, and a positioning device 22 for selectively adjusting the position of reflective element 20 within housing 18. Such reflective element is preferably an electrochromic mirror element which may be either of the electrochemichromic type, such as that disclosed in U.S. Pat. No. 5,140,455 issued to Varaprasad et al. and commonly assigned with the present application, the disclosure of which is hereby incorporated herein by reference, or may be of the solid-state type, such as that disclosed in U.S. Pat. No. 4,712,879 issued to Niall R. Lynam et al., U.S. patent application Ser. No. 08/023,675 filed Feb. 22, 1993, by Varaprasad et al. now abandoned, U.S. patent application Ser. No. 08/193,557 filed Feb. 8, 1994, by Varaprasad et al. now abandoned, and U.S. patent application Ser. No. 08/238,521 filed Mar. 5, 1994, by Varaprasad et al., all commonly assigned with the present application and as disclosed in U.S. Pat. No. 4,671,619 issued to Kamimiori et al., the disclosures of which are hereby incorporated herein by reference. Such electrochromic mirror elements are continuously variable and exhibit multiple partial reflectance states as the voltage applied thereto is varied. Alternately, the reflective element can be a conventional mirror, such as a chrome-coated mirror, or similarly metal reflector-coated substrate. Also, the reflective element can comprise a flat mirror, a convex mirror, or a multi-radius mirror, such as an aspheric mirror.

Figure 2:
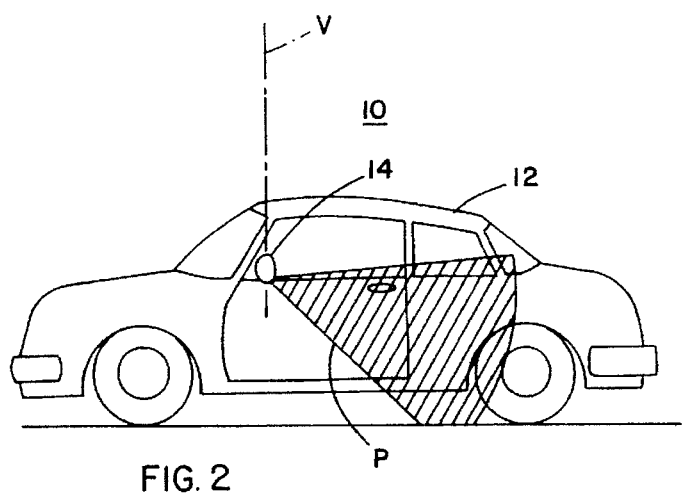
FIG. 2 is a side view of a vehicle incorporating the exterior mirror assembly in FIG. 1 illustrating a light pattern generated by the mirror assembly.
Figure 3:
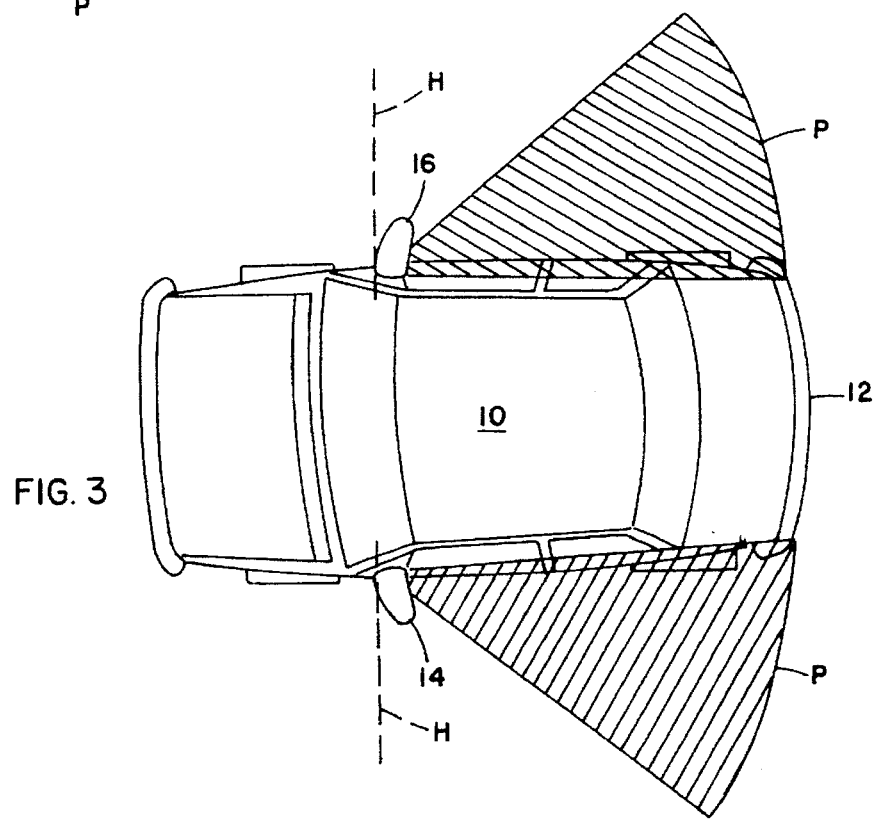
FIG. 3 is a top plan view of the vehicle in FIG. 2 illustrating the light pattern generated by a pair of exterior mirror assemblies.
Figure 4:
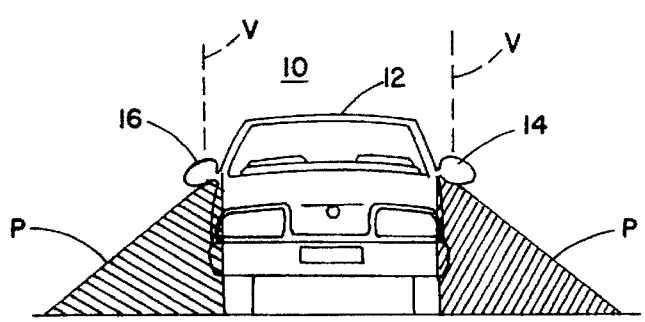
FIG. 4 is a front view of the vehicle in FIGS. 2 and 3 illustrating the pattern of light generated by the exterior mirror assemblies.

Each exterior mirror assembly 14, 16 additionally includes a light assembly 24 which emits light generally downwardly and rearwardly from housing 18. In the illustrated embodiment, light assembly 24 is a floodlight. Lighting assembly 24 is disclosed in detail in co-pending application Ser. No. 08/426,591 filed Apr. 21, 1995 now U.S. Pat No. 5,497,306, by Todd W. Pastrick for an EXTERIOR VEHICLE SECURITY LIGHT, the disclosure of which is hereby incorporated herein by reference. Lighting assembly 24 includes an enclosure 26, a light-emitting element, such as a lamp 28 in enclosure 26, and a cover 30 over enclosure 26. Lamp 28 is mounted in enclosure 26 by a socket 32 which provides ease of replacement of lamp 28, as well as supplied electrical power to the lamp from a control 34. Cover 30 may be an optical element, such as a diffusive lens or the like. In the illustrated embodiment, lighting assembly 24 generates a pattern of light P which extends generally downwardly and rearwardly from exterior mirror assembly 14, 16 (FIGS. 2–4). Light pattern P additionally washes the side of the vehicle and extends outwardly from the vehicle, as best illustrated in FIG. 3. In this manner, light assembly 24 illuminates the areas on both sides of vehicle 12 toward the rear of the vehicle.

In the illustrated embodiment, positioning device 22 is a conventional actuator capable of remotely positioning reflectance element 20 independently about both a vertical axis V and a horizontal axis H. Such actuators are well known in the art and may include a jackscrew-type actuator, such as Model No. H16-49-8001 (right-hand mirror) and Model No. H16-49-8051 (left-hand mirror) by Matsuyama of Kawagoe City, Japan, or may be a planetary-gear selector such as Model No. 54 (U.S. Pat. No. 4,281,899) sold by Industrie Koot BV (IKU) of Montfort, Netherlands. Such actuator may be remotely operated utilizing a joystick, or the like, by the driver in order to remotely position reflective element 20 in order to provide the desired view rearwardly of the vehicle. Positioning device 22 may include a memory feature whereby multiple positions of reflective element 20 may be stored in the memory in order to allow reflective element 20 to be selectively positioned to one or more predetermined positions, such as when vehicle 12 is used by multiple drivers. Alternatively, positioning device 22 may be a dedicated positioning device, of the type disclosed in U.S. Pat. No. 4,936,671 issued to Kaspar, the disclosure of which is hereby incorporated herein by reference. Regardless of its embodiment, positioning device 22 provides for selective positioning of reflective element 20 about a horizontal axis from a normal use position, wherein the reflective element is typically at an angle of approximately two to three degrees from vertical, to a downwardly tilted "power tilt" position wherein reflective element 20 is positioned in the general range of approximately four to six degrees from horizontal, or even greater. Such power tilt repositioning, which is under the operation of a mirror power tilt control 36, is selected in response to the user placing a reverse gear selector 38 of vehicle 12 in a reverse gear position.

Figure 8:
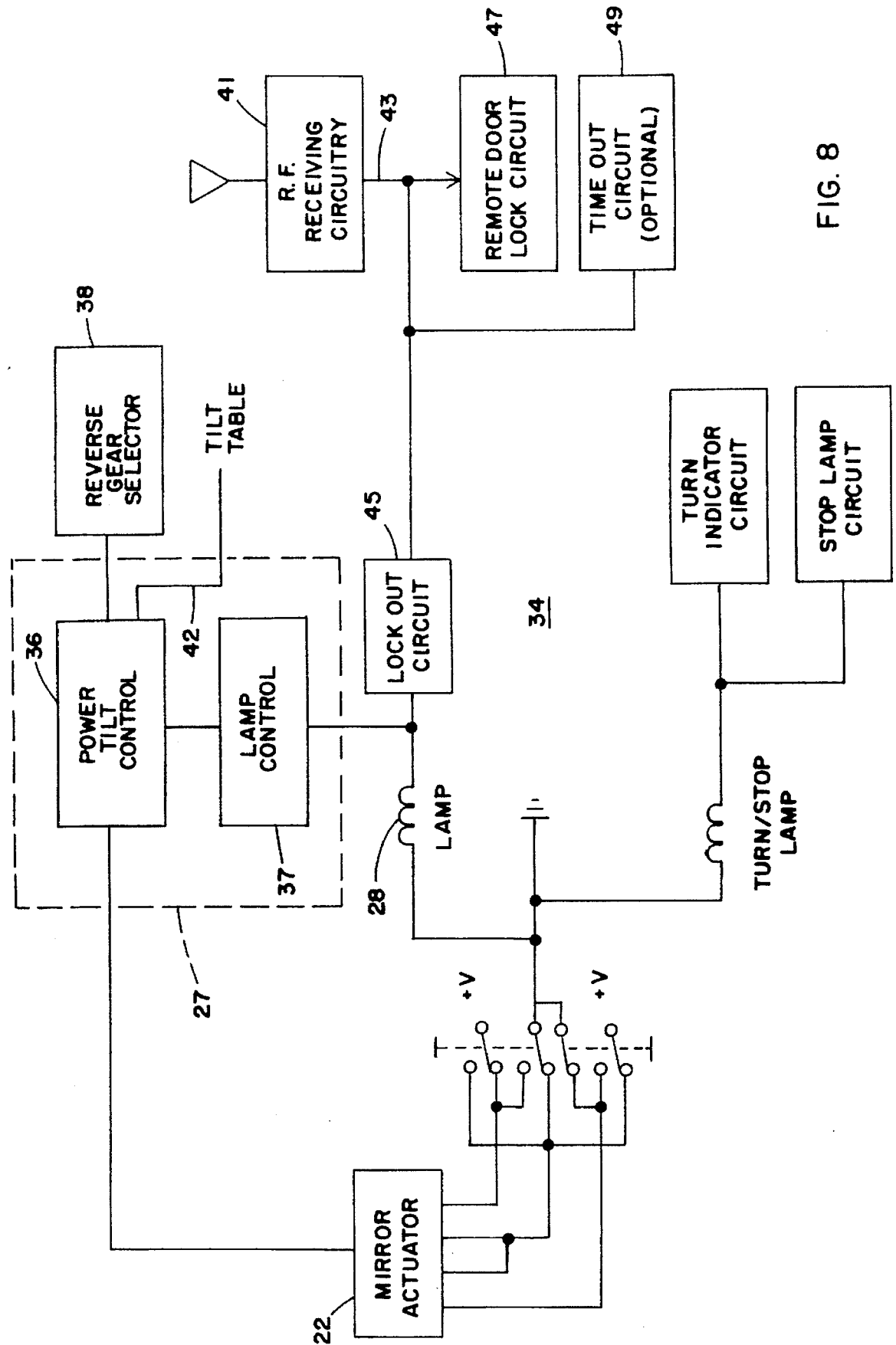
FIG. 8 is a block diagram of an electronic control circuit of a mirror system according to the invention.

As best seen by reference to FIG. 8, a rearview mirror system control 34 includes an illuminated power tilt control 27. Control 27 is made up of a mirror tilt control 36 which responds to reverse gear selector 38 being placed in reverse gear condition by operating mirror actuator or positioning device 22, in order to rotate reflective element 20 about a horizontal axis into a downwardly tilted position. Control 27 further includes a lamp control circuit 37 which responds to motor tilt control 36 by illuminating light assembly 24 when reflective element 20 is in a downwardly tilted position in order to illuminate objects in an area adjacent to the sides of vehicle 12. In the illustrated embodiment, control 34 further includes a keyless entry system including a remote transmitter (not shown) and a receiver 41. An output 43 of receiver 41 is connected through a lockout circuit 45 to lamp 28. Output 43 is further connected with a remote door lock circuit 47, wherein actuation of the remote transmitter unlocks the door. Output 43 may also be energized by a timeout circuit 49 which is actuated whenever the vehicle's passenger compartment interior light is actuated by opening of a door, operation of a switch, or the like.

The signal on output 43 actuates lamp 28 provided that lockout circuit 45 does not inhibit the signal. Lockout circuit 45 responds to operation of the vehicle in order to avoid actuation of lamp 28 when the vehicle is in motion. Such lockout circuits are conventional and may be responsive to placing of the vehicle transmission in gear or sensing of the speed of the vehicle, or the like. The lockout circuit may also be included in the vehicle's ignition system, such that the lamp is disabled when the engine is started and the vehicle is operating. Thus, the lamp will be off when the ignition switch is turned to start the engine. Lamp 28 is also actuated, in response to interior lighting device timeout circuit 49, whenever the interior lights of the vehicle are being actuated by timeout circuit 49, provided that lockout circuit 45 does not inhibit the signal to lamp 28. This is provided in order to allow lamp 28 to be actuated in response to the entry to, or exit from, vehicle 12 without the operator utilizing the remote transmitting device (not shown) to lock or unlock the doors.

The power tilt control provides an override of lockout circuit 45. Whenever the reverse gear selector 38 is operated, lamp control 37 responds to power tilt control 36 tilting the reflectance element by actuating lamp 24 even if lockout circuit 45 is inhibiting the signal from output 43. Therefore, when, and only when, the reverse gear is selected, lockout circuit 45 is overridden so that lamp 24 can be actuated even when the vehicle is operating. Operation of control 34 is otherwise as described in U.S. patent application Ser. No.

08/426,591 filed Apr. 21, 1995 now U.S. Pat. No. 5,497,306 for an EXTERIOR VEHICLE SECURITY LIGHT, the disclosure of which is incorporated herein by reference.

In a basic form, illuminated power tilt control 27 includes a logic function, which is illustrated as an AND gate 39 (FIG. 5). Gate 39 receives a first input 40 from reverse gear selector 38 and a second input 42 which is user operable in order to indicate that a tilt function is desired. Input 42 may be provided from a control computer which allows the user to set up various settings for vehicle functions, may be a manual selection switch, or the like. When both inputs are present, an output of gate 39 closes a switch 44. When closed, switch 44 connects lamp 28 between vehicle ignition 46 and chassis which causes the lamp to illuminate. The output of gate 39 also causes mirror actuator 22 to power tilt reflective element 20. Therefore, in order to illuminate lamp 28, tilt-enable must be selected, the vehicle must be in reverse gear, and the vehicle must be operating and thereby powering ignition 46.

In another form, an illuminated power control 127 includes an AND gate 139 which, in addition to receiving inputs 40 and 42, also receives an input 48 which indicates a low light condition in the area around the vehicle (FIG. 6). As is known in the art, such low light condition may be indicated by monitoring actuation of the vehicle's headlight control circuit, which may be a manually operated switch, or by a separate twilight sentinel of the type disclosed in co-pending U.S. patent application Ser. No. 08/277,674, filed by Jul. 19, 1994, for an AUTOMATIC REARVIEW MIRROR SYSTEM WITH AUTOMATIC HEADLIGHT ACTIVATION. If all inputs 40, 42, and 48 are present, switch 44 is closed and lamp 28 is actuated provided that ignition 46 is energized, indicating that the vehicle is operating.

Figure 7:
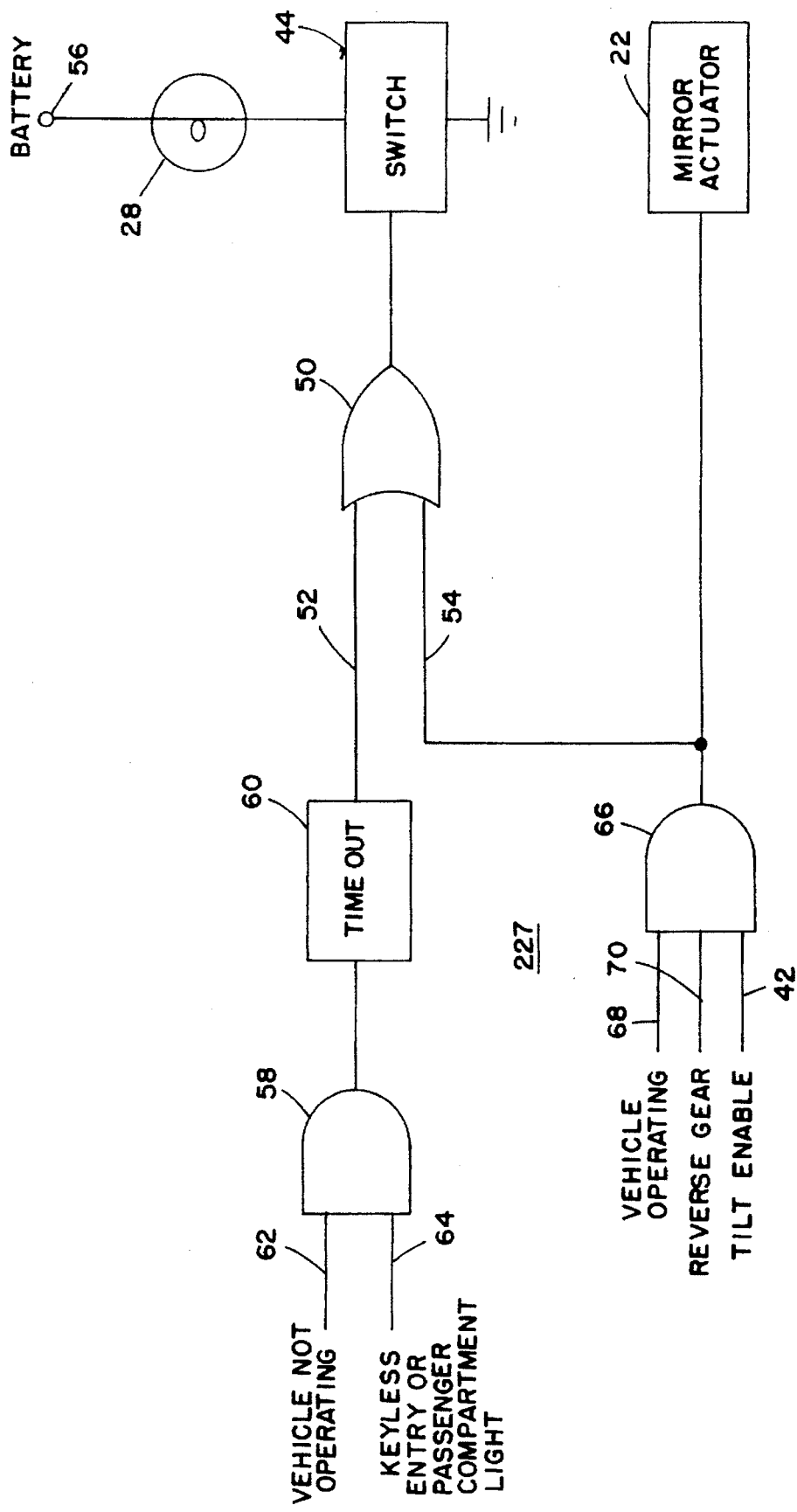
FIG. 7 is a block diagram of an electronic control circuit according to a second alternative embodiment of the invention.

In another form, an illuminated power control 227 includes an OR gate 50 having a first input 52 and a second input 54 (FIG. 7). OR gate 50 actuates switch 44 if either input 52 or 54 is present. Because the other terminal of lamp 28 connects directly with a battery connection 56, which is energized even when the vehicle is not operating, lamp 28 will be actuated whenever switch 44 is closed by OR gate 50. Input 52 to OR gate 50 is supplied from an AND gate 58 whose output is present through a timeout circuit 60 to input 52. AND gate 58 includes a first input 62, which is a lockout input that is present whenever the vehicle is not operating. AND gate 58 additionally includes an input 64 which is present whenever the operator operates a remote control; i.e., a keyless entry, or the operator has opened the door. Whenever the operator actuates the keyless entry, remote control, or the passenger compartment lights are operated because the operator has opened the vehicle door, the presence of input 64 causes AND gate 58 to generate an output provided that an input is present at 64 indicating that the vehicle is not operating. AND gate 58, in turn, provides an input 52 to OR gate 50 which, in turn, actuates lamp 28 for a period of time defined by timeout circuit 60. This feature, as is disclosed in application Ser. No. 08/426,591, actuates lamp 28 independently of the tilting of reflectance element 20.

Input 54 of OR gate 50 is supplied by the output of AND gate 66. The output of AND gate 66 is present whenever an input 68 indicates that the vehicle is operating, whenever an input 70 indicates that the vehicle is in reverse gear, and whenever input 42 indicates that the tilt-enable function is selected. Input 54 to OR gate 50 actuates lamp 28 in unison with mirror tilt control 36 tilting reflectance element 20 to a tilted orientation provided that the vehicle is operating.

It should be understood that the diagrams illustrated in FIGS. 5-8 are intended to illustrate the nature of the invention, which may be implemented utilizing any form of logic including discrete logic circuitry, analog circuitry, a microprocessor control, or the like.

Thus, it is seen that the present invention provides a mirror system for a vehicle which, for the first time, provides a truly useful parking aid which is functional to provide rearward vision to the side of the vehicle under all operating conditions including low light conditions that are found at night. The invention is particularly useful with an exterior mirror lighting system controlled through a lockout system that normally allows the lamp to be activated only when the vehicle is not being operated. Thus, when, and only when, the reverse gear is selected, the lock-out circuit is overridden so that the lamp can be activated even when the vehicle is operating.

The present invention may also be applied to foldaway exterior review mirror systems in which the exterior mirror, or mirrors, retract to a position close to the side of the vehicle when a storage selector is activated. The present invention is useful when the foldaway mirrors are extended in their use position.

Also, the illuminated power tilt exterior mirror of this invention may be part of a multiple mirror interactive system, including, for example, a three-mirror inside/outside system provided presently in automobiles. In such multiple mirror interactive system, adjustment of the field of view of only one of the mirrors in the multiple mirror system sets the proper field of view alignment for the other mirrors in the multiple mirror system.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A mirror system for a vehicle having a reverse gear selector, comprising:

a first exterior mirror assembly having a first reflective element, a first housing for said first reflective element, and a first positioning device for selectively positioning said first reflective element at least about a first horizontal axis;

a control that is responsive to said vehicle reverse gear selector being placed in a reverse gear mode for causing said first positioning device to position said first reflective element about said first horizontal axis to a downwardly tilted position to view a first area adjacent a first side of the vehicle; and a first light for emitting light generally downwardly from said first housing on said first area;

wherein said control actuates said first light at least as a function of said first reflective element being in said downwardly tilted position in order to illuminate objects in said first area and wherein said control actuates said first light also as a function of light conditions outside of said vehicle wherein said control actuates said first light only during low light conditions.

2. The mirror assembly in claim 1 wherein said control is responsive to one of a headlamp control circuit and a twilight sentinel circuit for determining light conditions outside of said vehicle.

3. A mirror system for a vehicle having a reverse gear selector comprising:

a first exterior mirror assembly having a first reflective element, a first housing for said first reflective element, and a first positioning device for selectively positioning said first reflective element at least about a first horizontal axis;

a control that is responsive to said vehicle reverse gear selector being placed in a reverse gear mode for causing said first positioning device to position said first reflective element about said first horizontal axis to a downwardly tilted position to view a first area adjacent a first side of the vehicle; and a first light for emitting light generally downwardly from said first housing on said first area;

wherein said control actuates said first light at least as a function of said first reflective element being in said downwardly tilted position in order to illuminate objects in said first area and wherein said control includes a user input device that receives a user selection to disable said control from positioning said first reflective element in said downwardly tilted position.

4. A mirror system for a vehicle having a propulsion system and a reverse gear selector, comprising:

a first exterior mirror assembly having a first reflective element, a first housing for said first reflective element, and a first positioning device for selectively positioning said first reflective element at least about a first horizontal axis;

a control that is responsive to said vehicle reverse gear selector being placed in a reverse gear mode for causing said first positioning device to position said first reflective element about said first horizontal axis to a downwardly tilted position to view a first area adjacent a first side of the vehicle; and a first light for emitting light generally downwardly from said first housing on said first area;

wherein said control actuates said first light at least as a function of said first reflective element being in said downwardly tilted position in order to illuminate objects in said first area, said control further including a user operable device for actuating said first light, a lockout circuit for inhibiting said user operable device from actuating said first light when the vehicle propulsion system is operating and an override for said lockout that is responsive to said reverse gear selector for overriding said lockout circuit when the vehicle is in a reverse gear.

5. The mirror assembly in claim 4 wherein said user operable device is one of a keyless entry system and a door-operated switch.

6. The mirror assembly in claim 1 wherein said control includes a memory for storing at least one position of said first reflective element and wherein said downwardly tilted position of said first reflective element is stored in said memory.

7. The mirror assembly in claim 1 wherein said first positioning device also selectively positions said first reflective element about a vertical axis.

8. The mirror assembly in claim 1 further including;

a second exterior mirror assembly having a second reflective element, a second housing for said second reflective element, and a second positioning device for selectively positioning said second reflective element at least about a second horizontal axis;

said control being responsive to said vehicle reverse gear selector being placed in a reverse gear mode for causing said second positioning device to position said second reflective element about said second horizontal axis to a downwardly tilted position to view a second area adjacent a second side of the vehicle; and a second light for emitting light generally downwardly from said second housing on said second area;

wherein said control actuates said second light at least as a function of said second reflective element being in said downwardly tilted position in order to illuminate objects in said second area.

9. The mirror assembly in claim 8 wherein said first mirror assembly is a driver side mirror.

10. The mirror assembly in claim 9 wherein said second mirror assembly is a passenger side mirror.

11. The mirror assembly in claim 1 wherein said first mirror assembly is a driver side mirror.

12. The mirror assembly in claim 1 wherein said first mirror assembly is a passenger side mirror.

13. The mirror assembly in claim 1 wherein said first reflective element is an electrochromic mirror element.

14. The mirror assembly in claim 8 wherein said first and second reflective elements are electrochromic mirror elements.

15. A mirror system for a vehicle having a propulsion system and a reverse gear selector, comprising:

a first exterior mirror assembly having a first reflective element, a first housing for said first reflective element, and a first positioning device for selectively positioning said first reflective element at least about a first horizontal axis to a downwardly tilted position to view a first area adjacent a first side of the vehicle;

a first light for emitting light generally downwardly from said first housing on said first area;

a user operable lamp selector; and a control that includes a first input that is responsive to the operating condition of the propulsion system of said vehicle, a second input that is responsive to said vehicle reverse gear selector, a third input that is responsive to said user operable lamp selector, wherein said control includes a first output for selectively actuating said first light and a second output for selectively causing said first positioning device to position said first reflective element about said first horizontal axis to said downwardly tilted position;

wherein said control causes said first positioning device to position said first reflective element to said downwardly tilted position in response to said reverse gear selector being in a reverse mode and actuates said first light in response to one of a first and second condition, said first condition being said user operable lamp selector being operated and said vehicle propulsion system being in a non-operating condition, said second condition being said reverse gear selector being in a reverse mode.

16. The mirror assembly in claim 15 wherein said control further includes a fourth input that is responsive to one of a headlamp control circuit and a twilight sentinel circuit and wherein said second condition further including said fourth input indicating a low light condition around the vehicle.

17. The mirror assembly in claim 15 wherein said user operable lamp selector includes at least one of a keyless entry system and an interior lamp control circuit.

18. The mirror assembly in claim 15 wherein said control includes a user input device that receives a user selection to disable said control from positioning said first reflective element in said downwardly tilted position.

19. The mirror assembly in claim 15 wherein said control includes a memory for storing at least one position of said first reflective element and wherein said downwardly tilted position of said first reflective element is stored in said memory.

20. The mirror assembly in claim 15 wherein said first positioning device also selectively positions said first reflective element about a vertical axis.

21. The mirror assembly in claim 15 further including:
a second exterior mirror assembly having a second reflective element, a second housing for said second reflective element and a second positioning device for selectively positioning said second reflective element at least about a second horizontal axis to a downwardly tilted position to view a second area adjacent a second side of the vehicle; and
a second light for emitting light generally downwardly from said second housing on said second area;
wherein said control further includes a third output for selectively actuating said second light and a fourth output for selectively causing said second positioning device to position said second reflective element about said second horizontal axis to a downwardly tilted position;
wherein said control further causes said second positioning device to position said second reflective element to said downwardly tilted position in response to said reverse gear selector being in a reverse mode and actuates said second light in response to said first or second condition.

22. The mirror assembly in claim 21 wherein said first mirror assembly is a driver side mirror.

23. The mirror assembly in claim 20 wherein said second mirror assembly is a passenger side mirror.

24. The mirror assembly in claim 15 wherein said first mirror assembly is a driver side mirror.

25. The mirror assembly in claim 15 wherein said first reflective element is an electrochromic mirror element.

26. The mirror assembly in claim 21 wherein said second reflective elements are electrochromic mirror elements.

27. A mirror system for a vehicle having a propulsion system and a reverse gear selector, comprising:
an exterior mirror assembly having a reflective element, a housing for said reflective element, and a positioning device for selectively positioning said reflective element to a downwardly tilted position to view an area adjacent a side of the vehicle;
a tilt control that is responsive to said vehicle gear selector being placed in a reverse gear mode for causing said positioning device to position said reflective element in said downwardly tilted position;
a light for emitting light generally downwardly from said housing on said area; and
a light actuation circuit for actuating said light, said light actuation circuit including a lockout circuit for avoiding actuation of said light when the propulsion system of said vehicle is in an operating condition, and an override circuit responsive to said vehicle reverse gear selector being in said reverse gear mode for overriding said lockout circuit.

28. The mirror assembly in claim 27 wherein said light actuation circuit includes a user operable light selector.

29. The mirror assembly in claim 28 wherein said user operable lamp selector includes at least one of a keyless entry system and an interior lamp control circuit.

30. The mirror assembly in claim 27 wherein said reflective element is an electrochromic mirror element.

* * * * *

UNITED STATES PATENT AND TRADEMARK OFFICE
CERTIFICATE OF CORRECTION

PATENT NO.    : 5,624,176
DATED         : April 29, 1997
INVENTOR(S)   : Desmond J. O'Farrell and Roger L. Veldman It is certified that error appears in the above-identified patent and that said Letters Patent is hereby corrected as shown below:

Column 6, line 67, claim 3:
    Insert --,-- after "selector".

Column 9, line 31, claim 23:
    "20" should be --22--.

Signed and Sealed this

Seventeenth Day of August, 1999

Attest:

Q. TODD DICKINSON

Attesting Officer    Acting Commissioner of Patents and Trademarks